Dec. 28, 1926.    1,612,567
L. W. BROWNE
PILOT OPERATED RELIEF VALVE
Filed April 14, 1926

Witness
L. F. Sandberg

Inventor
Lyle W. Browne
by Bair & Freeman Attorneys

Patented Dec. 28, 1926.

1,612,567

UNITED STATES PATENT OFFICE.

LYLE W. BROWNE, OF MARSHALLTOWN, IOWA, ASSIGNOR TO THE FISHER GOVERNOR COMPANY, OF MARSHALLTOWN, IOWA.

PILOT-OPERATED RELIEF VALVE.

Application filed April 14, 1926. Serial No. 102,086.

My invention relates to a pilot operated relief valve of the kind employed in a pressure line, to relieve excessive pressure and thus maintain a steady maximum pressure therein.

It is my purpose to provide a pilot operated relief valve structure of simple, durable and inexpensive construction.

Furthermore, it is my object to provide a device of the kind mentioned, having such elements of structure and arrangement and cooperation of parts, as to control a valve in a pressure line, for the purposes mentioned. My device is adjustable to make it adaptable for controlling fluid flow in such manner as to afford relief flow when the pressure in the line rises to exceed that for which the device is set.

Another purpose is to provide a valve of the kind under consideration, pilot operated in such manner that the valve is positively actuated for substantial movement, when the device operates for either opening or closing it, and does not hover or flutter.

More particularly, it is my purpose to provide in this connection a novel structural device, including a valve installed in a pressure line and a pressure sensitive member connected therewith, constrained toward valve closing position and subject on one side to pressure in the line on one side of the valve. Interposed between the other side of the pressure sensitive member and the other side of the valve is a conducting passage, controlled by a pilot valve, and a second pressure sensitive member so arranged as to subject the first pressure sensitive member to the pressure on such other side of the valve, when that pressure reaches a certain height for valve opening actuation. The parts are so arranged that the pilot valve closes when the pressure in the line is adequately lowered.

The first pressure sensitive member is made subject to pressure on its side farthest from the valve through a restricted passage, which permits reduction of pressure on such side when the pilot valve and the control valve are closed.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figures 1, 2, 3:
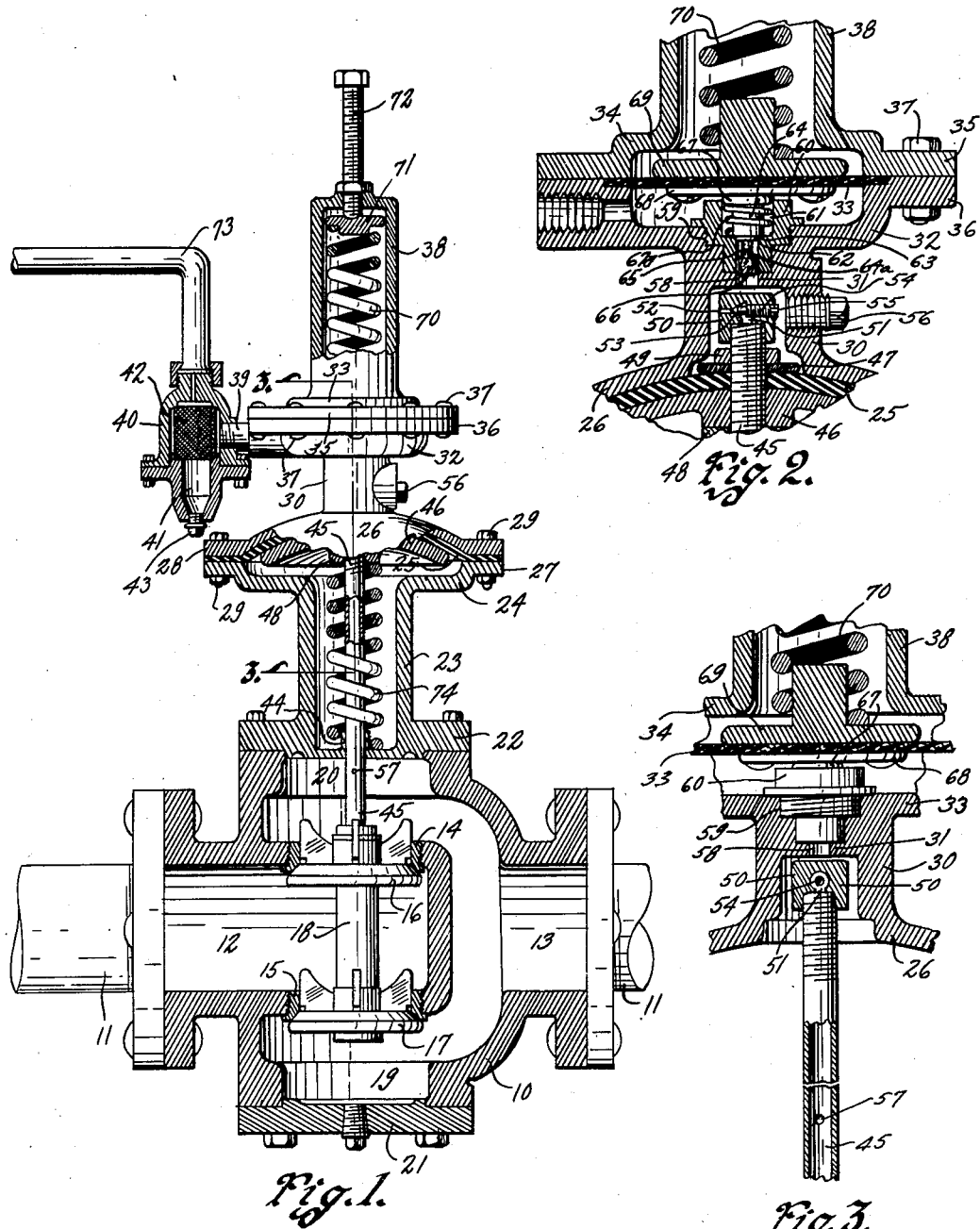
Figure 1 is a central, sectional view through my improved pilot operated relief valve.
Figure 2 is an enlarged, detail, sectional view of the pilot valve and adjacent parts, taken in the same plane as Figure 1.
Figure 3 is a sectional view of the pilot valve taken on the line 3—3 of Figure 2, at a right angle to the view shown in Figure 2.

In the drawings herewith, whereby a form of my invention is illustrated, there is shown a valve body indicated by the reference numeral 10, which is installed in a pressure pipe line 11. The inlet passage of the valve body on the high pressure side is indicated at 12 and the outlet passage at 13.

In the valve body are valve seats 14 and 15, with which valves 16 and 17 connected by a post 18, coact. On opposite sides of the valve body 10 are openings 19 and 20. The opening 19 is covered by a plate 21 and the opening 20 by a cap or plate 22.

For purposes of illustration and convenience of description, I will consider the device, as shown in Figure 1, to be in upright position.

Extending upwardly from the plate 22 is a tubular sleeve 23. At the upper end of the sleeve 23 is the lower half 24 of a casing for a pressure sensitive member or diaphragm 25. The casing member 24 and an upper diaphragm casing member 26 have coacting flanges 27 and 28. The flanges 27 and 28 are secured together with the edge of the diaphragm 25 between them by means of bolts 29.

A tubular member 30, communicates with the interior of the diaphragm casing formed by the members 24 and 26 and extends upwardly therefrom. In the tubular member 30 is a partition 31. Communicating with the upper part of the member 30 above the partition 31 is the lower half 32 of another casing for the pressure sensitive element or diaphragm 33. The upper half of this second casing, indicated at 34, has a peripheral flange 35, which corresponds to a similar flange 36 on the member 32. The flanges 35 and 36 are secured together with the edge of the diaphragm 33 between them by bolts 37. Communicating with this second diaphragm casing and extending upwardly therefrom is a sleeve 38, closed at its upper end.

Communicating with the upper or second diaphragm casing by suitable means, such as a short section of pipe 39, is a casing 40, which has a sediment pocket 41 and contains a foraminous strainer 42. The casing 40 is preferably made in separable halves to permit it to be conveniently taken apart for allowing access to its interior. At the bottom of the sediment pocket 41 is a cleanout or drain plug 43.

Extending upwardly from the upper valve 16 through a suitable opening 44 in the plate 22 is a valve stem 45, which is preferably a tube. This stem 45 extends through and projects beyond the diaphragm 25 and is externally screw-threaded at its upper end.

The under side of the casing member 26 is concave as shown in Figure 1. On the stem 45 on the under side of the diaphragm 25 is a diaphragm head 46, the upper surface of which is correspondingly convex. On the stem 45 above the diaphragm is a smaller head 47. The heads 46 and 47 are held properly in place by nuts 48 and 49 screwed on the stem 45.

Screwed on the upper end of the stem 45 above the nut 49 is a closure cap 50. This cap has passages 51 and 52 arranged at right angles to each other and affording communication between the interior of the stem 45 and the interior of the tubular member 30 below the partition 31.

Formed in the passage 52 is a valve seat 53. A valve 54 is screwed into the cap 50 to adjustably coact with the seat 53, and thus control fluid flow through the passages 51 and 52. The outer end of the stem portion of the valve 54 is formed with a screw driver slot 55. The tubular member 30 is drilled and tapped to receive a screw plug 56, which can be conveniently removed to afford access to the valve 54 for adjusting it.

In the wall of the tubular stem 45 below the diaphragm 25 and preferably below the plate 22 is an opening 57.

It will thus be seen that when the valve 54 is not seated, there is communication between the upper part of the casing for the diaphragm 25 and the low pressure side of the valves 16 and 17 and of the pipe line through the restricted passage around the valve 54 and the passage 51 and stem 45.

The opening 44 is large enough to allow the passage of fluid around the stem 45, and the under side of the diaphragm 25, that nearest the pipe line control valve structure is thus subject to the pressure on the low pressure side of the line. It is obvious that the hole 57 could be above the plate 22 as well as below it.

Extending through the partition 31 is a small passage 58. At the upper end of the passage 58 is an enlarged, interiorly threaded socket 59, which receives a tubular plug 60. The upper part of the bore of the plug 60, as indicated at 61 is of greater diameter than the lower portion 62 thereof. At the lower part of the upper bore portion 61 is a valve seat 63.

A valve 64 is arranged to coact with the seat 63 and has a downward extension 64ª received and guided in the bore portion 62 of the plug 60. The extension 64ª has an annular groove 65 just below the valve proper 64, and has flat faces 66 extending from the groove 65 to its lower end, to allow for fluid flow. At the upper end of the stem portion of the valve 64 is a triangular head 67. A coil spring 67ª is mounted on the valve 64 between the head 67 and the bottom of the bore portion 61 for normally tending to hold the valve 64 off the seat 63.

The diaphragm 33 has the lower head or plate 68 and the upper head or plate 69 suitably connected together. The diaphragm head 68 normally rests on the head 67 of the valve 64. The upper head 69 forms a seat for a coil spring 70 received in the sleeve 38. In the upper end of the sleeve 38 is a seat 71 for the upper end of the spring 70. Threaded into the upper end of the sleeve 38 is an adjusting screw 72 for adjusting the seat 71 and thus regulating the tension of the spring 70.

The casing 40 communicates with the pressure side of the pipe line by means of a by-pass pipe 73.

In the practical use of my pilot operated relief valve, the valve body 10 is installed in the pipe line with the inlet 12 on the high pressure side. The pipe 73 is connected as heretofore explained.

The tension of the spring 70 is adjusted so that any pressure above that which is to be the maximum, the high pressure side of the line, will raise the diaphragm 33 against the pressure of the spring 70 and permit the spring 67ª to raise the pilot valve 64.

It will be understood that the fluid discharged past the valves 16 and 17 may be discharged to atmosphere or to a lower pressure gathering line or the like. On the stem 45 between the plate 22 and the head 46 is a coil spring 74, which tends to hold the greater part of the diaphragm snugly hugged against the casing member 26.

When the valve 64 is unseated, as explained, fluid under pressure will pass around it, through the groove 65 and passage 58 to the interior of the tubular member 30 above the diaphragm 25.

The pressure then moves the diaphragm 25 downwardly against the tension of the spring 74 for unseating the valves 16 and 17. Thereupon the fluid may pass through the valve body 10 and the excessive pressure will be relieved.

As soon as the pressure in the line is reduced to the point where it will not overcome the pressure of the spring 70 on the diaphragm 33, that spring forces the diaphragm 33 downwardly, thus closing the valve 64. Since fluid above the diaphragm may pass that diaphragm through the passages 52 and 51, tubular stem 45, and opening 57, it is obvious that when the valve 64 is closed, the fluid pressure above and below the diaphragm 25 will tend to equalize and thereupon the spring 74 will move the diaphragm upwardly, till it engages the wall of the casing member 26. It will be seen that if the diaphragm 25 is of rubber, it will so hug the casing wall, that there will then be less area of diaphragm subject to pressure above than below, and the pressure in the sleeve 23 will add its function to that of the spring 71, in holding the diaphragm 74 up and the valves 16 and 17 closed.

Thereafter there will be no tendency on the part of the valves 16 and 17 to hover or chatter.

It will be noted that the movement of these valves is positive whether their movement be toward opening or closing.

It will be noted that the device is capable of a variety of adjustments for adapting the structure to varieties of service conditions.

The tension of the spring 70 may be regulated by means of the adjusting screw 72 for determining the point at which the pressure in the high pressure side of the line shall be relieved.

The valve 54 may be readily and easily adjusted for regulating the size of the passage 52, so that the valves 16 and 17 may always close with a regular and steady movement, regardless of the pressure which is maintained in the low pressure side of the line.

Changes may be made in the details of the structure and arrangement of the parts of my improved pilot operated relief valve, without departing from the real spirit and purpose of my invention, and it is my intention to cover by my claim, any modifications in structure or use of mechanical equivalents, which may be reasonably included within their scope.

I claim as my invention:

In a pilot operated relief valve, a fluid conducting line, a valve casing interposed therein having a valve port, a valve for cooperating with said port, a diaphragm casing supported on said valve casing having on its interior on the side away from the valve a concave face, a diaphragm in said diaphragm casing, said valve having a stem projecting through the wall of the valve casing and having a diaphragm head with a convex face adjacent to the diaphragm adapted to press the diaphragm snugly against said concave face when the valve is closed, a spring for normally holding the valve closed and the diaphragm against said concave face, a tubular member communicating with the diaphragm chamber and leading away from the central part of said concave face, said stem being extended through the diaphragm and having a passage through it for affording communication between the interior of the valve casing and the diaphragm chamber on the side away from the valve casing, an adjustable valve for controlling flow through said passage, and a second pressure sensitive member, a casing therefor, said parts having a passage from said last casing to said tubular member, a valve for controlling flow through said last passage, a spring for actuating the second pressure sensitive member for holding said last valve closed, said last valve being constrained toward opening, means for affording communication between said last-described chamber and the incoming side of the fluid pressure line for subjecting said last-named pressure sensitive member to pressure in said line against the tension of the last-named spring.

Des Moines, Iowa, April 2, 1926.

LYLE W. BROWNE.